(12) United States Patent
Litchfield

(10) Patent No.: US 7,048,656 B2
(45) Date of Patent: May 23, 2006

(54) BALL AND A METHOD OF MANUFACTURING A BALL

(76) Inventor: Peter Graham Litchfield, 6 Ella Grove, Chelsea, Victoria 3196 (AU)

( * ) Notice: Subject to any disclaimer, the term of this patent is extended or adjusted under 35 U.S.C. 154(b) by 0 days.

(21) Appl. No.: 10/476,512

(22) PCT Filed: May 3, 2002

(86) PCT No.: PCT/AU02/00541

§ 371 (c)(1),
(2), (4) Date: Mar. 23, 2004

(87) PCT Pub. No.: WO02/089925

PCT Pub. Date: Nov. 14, 2002

(65) Prior Publication Data

US 2005/0079936 A1    Apr. 14, 2005

(30) Foreign Application Priority Data

May 3, 2001   (AU) .................................... PR4746
May 14, 2001  (AU) .................................... PR4970
Jun. 19, 2001  (AU) .................................... PR5799

(51) Int. Cl.
*A63B 37/14* (2006.01)
(52) U.S. Cl. ...................... 473/598; 473/600
(58) Field of Classification Search ................ 473/451, 473/615, 596, 597, 613, 598
See application file for complete search history.

(56) References Cited

U.S. PATENT DOCUMENTS

| | | | | |
|---|---|---|---|---|
| 1,931,429 A | * | 10/1933 | Buckner et al. | ............. 473/596 |
| 4,874,169 A | * | 10/1989 | Litchfield | ................... 473/613 |
| 5,407,193 A | * | 4/1995 | McGinley | .................... 473/598 |
| 6,261,197 B1 | * | 7/2001 | Grechko | ..................... 473/598 |
| 6,837,814 B1 | * | 1/2005 | Thomas | ...................... 473/613 |
| 2002/0025866 A1 | * | 2/2002 | Thomas | ...................... 473/598 |

FOREIGN PATENT DOCUMENTS

| | | | |
|---|---|---|---|
| GB | 2097320 A | * | 11/1982 |
| GB | 2314778 A | * | 1/1998 |

* cited by examiner

*Primary Examiner*—Steven Wong
(74) *Attorney, Agent, or Firm*—Finnegan, Henderson, Farabow, Garrett & Dunner, L.L.P.

(57) ABSTRACT

A spherical ball, for projection through the air to deviate from an expected trajectory, has a first hemisphere (12) and a second hemisphere (14). The surfaces (52, 54) of the first hemisphere (12) and the second hemisphere (14) are generally smooth, except for the provision of a simulated seam (53) which gives the ball the appearance of a baseball. An insert (40) of felt-like material is provided in the second hemisphere (14) with the surface of the insert (40) flush with the surface (54) of the hemisphere (14). When the ball is projected along the plane of the line (16) between the hemispheres (12, 14), it will deviate from that plane in the direction of the first hemisphere (12). The ball is manufactured by locating the insert (40) in a mould (60) and injecting polyurethane foam (64) into the mould (60) with the insert (40) bonding with the foam, (64).

17 Claims, 4 Drawing Sheets

BALL AND A METHOD OF MANUFACTURING A BALL

BACKGROUND OF THE INVENTION

This invention relates to a ball, and to a method of manufacturing a ball, and more particularly relates to a ball which may be thrown to deviate from an expected trajectory.

In ball games such a cricket and baseball, the ability to "swing" or "curve" a ball is highly prized. To be able to move a ball from a "normal" trajectory usually takes a degree of skill. For those not sufficiently skilled, or for those who wish to play or train with a ball that will deviate without the bowler or pitcher having sufficient skill, a special ball is required.

Australian Patent No. 588223, and equivalent U.S. Pat. No. 4,874,169, both to Peter Graham Litchfield, describe a ball designed to deviate in flight when bowled as in the game of cricket or thrown as in the game of baseball. In this specification, hemisphere 12 has the same meaning as first hemisphere 12 referred to in the abovementioned patents, hemisphere 14 has the same meaning as second hemisphere 14 referred to in the abovementioned patents, and line 16 between hemispheres 12 and 14 has the same meaning as line 16 referred to in the abovementioned patents.

Hemisphere 12 is the 'fast' side of the ball and it is therefore desirous to achieve minimum aerodynamic drag on this hemisphere. The abovementioned patents well describe how this may be achieved. Hemisphere 14 is the 'slow' side of the ball and it is therefore desirous to achieve maximum aerodynamic drag on this hemisphere. The abovementioned patents describe this hemisphere as being either generally smooth, or generally rough, or as having a felt like texture thereon, and all such embodiments have been shown to be effective.

If any ball in the above mentioned patents, or any ball in this specification, is propelled along the plane of line 16, the ball will deviate from that plane in the direction of hemisphere 12. The ball need only have normal back spin imparted on release, no other 'special' spin is required or desired to be imparted to the ball.

In the game of cricket, a conventional cricket ball has a stitched seam along the line 16 between hemispheres 12 and 14 of any ball in the abovementioned patents. The abovementioned patents state that "A simulated seam could be included, as long as it coincided with line 16 it would not adversely effect the performance of the ball." A simulated cricket ball seam (raised or depressed) can therefore be included on any embodiment of a ball claimed in the abovementioned patents, without adversely affecting the performance of the ball.

In the game of baseball, a conventional baseball has a stitched seam, which is raised, but not parallel to any line between two hemispheres. Therefore, the seam does adversely affect the performance of the ball when trying to achieve deviation by projecting such a ball in the manner described in the abovementioned patents. The seam forms the "dumbbell" shaped portions of the ball, and give a baseball its unique appearance and feel.

In Australian Patent No. 588223, it is stated that: "A ball may have a simulated seam in the pattern of actual seams on baseballs or tennis balls and such could incorporate the depressions or protrusions". Although this is true, simulated raised baseball type seams do not adapt well to balls described in the aforementioned patents for the following reasons.

Firstly, although the raised seam somewhat constitutes the disturbance or "two-level" effect required on hemisphere 12, it is also mirrored on hemisphere 14, and therefore any tendency for the ball to deviate in flight is neutralised. Secondly, the appearance and feel of the raised seam is lost if hemisphere 14 is provided with moulded homogenous roughness as outlined in the abovementioned patents.

Modified tennis balls can be employed for hemisphere 14, but the look and feel of a baseball is not achieved. Furthermore, the desired raised seams are not present on hemisphere 14 of tennis balls unless they are subsequently bonded onto the outer surface. This further complicates difficulties already experienced when trying to manufacture hybrid balls of this general type. That is, half tennis ball and half rubber (or synthetic) ball. Balls of this type also have inherent structural weakness at the join line between the two hemispheres, and have a tendency to go "out of shape".

It is an object of this invention to provide an improved or alternative ball of the general type described in Australian Patent No. 588223 and U.S. Pat. No. 4,874,169, including an improved simulated baseball. It is also an object of the invention to provide a cost-effective means of producing such a ball.

SUMMARY OF THE INVENTION

The invention provides a ball having a generally spherical shape, said generally spherical shape being comprised of a first hemisphere having a generally hemispherical shape, and a second hemisphere having a generally hemispherical shape, one or more portions of the surface of said second hemisphere being constituted by a material, or a degree of smoothness or roughness, which contrasts with the degree of smoothness or roughness of the remainder of said surface.

The invention also provides a method of manufacturing a ball, including the steps of:
  locating within a mould a piece, or a plurality of pieces, of a first material, said first material being intended to form part of said ball; and
  supplying said mould with a second material, said second material being intended to form the remainder of said ball.

The invention further provides a ball including a core and an outer cover adapted to surround said core, characterised in that said cover includes a portion which has a contrasting roughness or smoothness in relation to the remainder of said cover.

BRIEF DESCRIPTION OF THE DRAWINGS

Embodiments of the invention, which may be preferred, will be described in detail hereinafter, with reference to the accompanying drawings, in which.

DETAILED DESCRIPTION OF THE INVENTION

In the following description of FIGS. 1, 2 and 3, hemisphere 12, hemisphere 14, and line 16, have the same general meaning as hemisphere 12, hemisphere 14, and line 16 respectively, referred to in Australian Patent No. 588223 and U.S. Pat. No. 4,874,169, as has been stated earlier in this specification.

In a general discussion of the balls of the present invention, hemisphere 14 is well suited to having portions of generally smooth surface, in combination with portions of generally rough surface. Such a combination of surface treatment also helps to overcome difficulties encountered when trying to construct a ball that has an effective hemisphere 14.

The present invention concentrates mainly on second hemisphere 14, and describes improvements to that hemisphere. In particular, it concentrates on the inclusion of an insert in hemisphere 14, which has a contrasting surface characteristic to that of the remainder of the hemisphere. Preferably, the insert is made from generally rough felt or felt-like material 14. Such a felt insert need only occupy about on third of the surface area of hemisphere 14, with the balance of area remaining generally smooth.

The present invention also describes, in one embodiment, a flexible polyurethane foam ball which has the appearance and feel of a conventional baseball, yet is capable of being thrown to deviate (curve) in flight in the manner described in the abovementioned patents.

It is the wish of many a fan of baseball to be able to throw a curve ball like "the pro's". Although conventional polyurethane foam seamed baseballs are common in the market place, they cannot be thrown to curve in the manner described in the aforementioned patents. The ball of FIGS. 1, 2 and 3 has the appearance of a baseball, and can be thrown to deviate from an expected trajectory.

Figure 1:
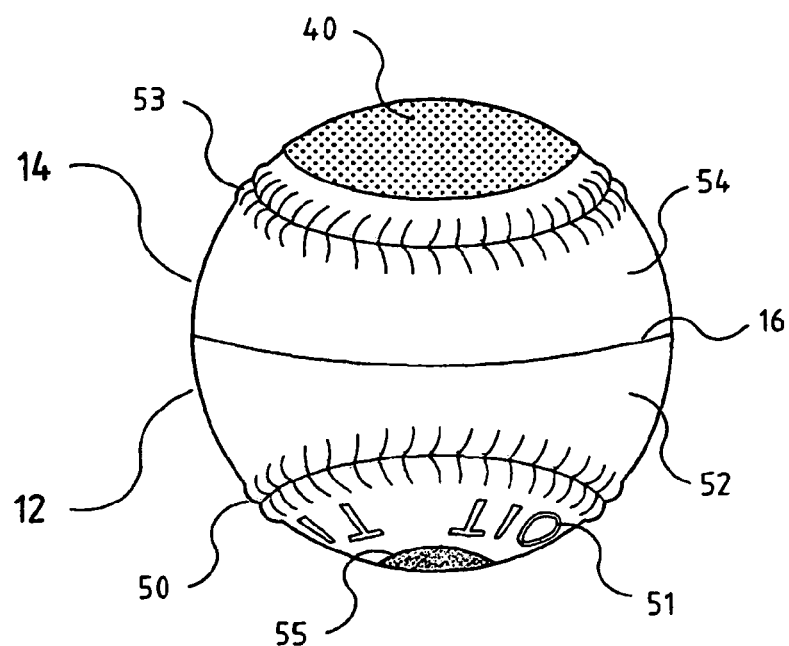
FIG. 1 is a front elevation of a ball in accordance with a first embodiment of the present invention.
Figure 2:
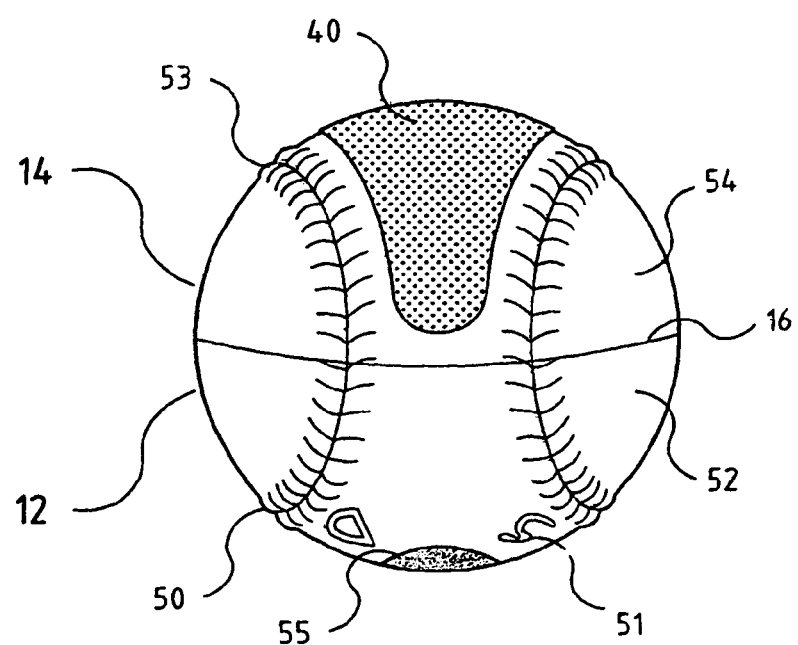
FIG. 2 is a rear elevation of the ball of FIG. 1.
Figure 3:
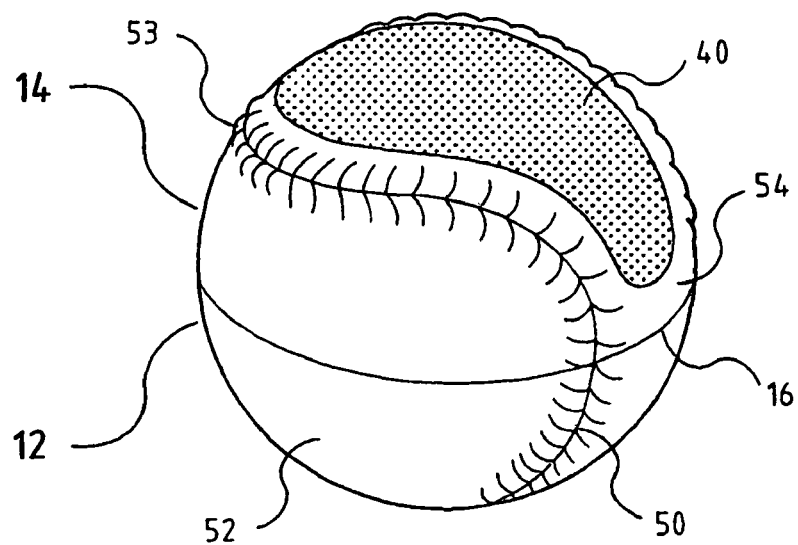
FIG. 3 is a perspective view of the ball of FIG. 1.

In the ball of FIGS. 1, 2 and 3, the required disturbance or "two-level" surface characteristics described for hemisphere 12 in the aforementioned patents are, to a large extent, provided by the raised baseball-like seam 50 which lies predominately within the middle one-third of the hemisphere. Again, raised or recessed logos, trademarks or lettering 51 may also be included on hemisphere 12. The remaining portion 52 of hemisphere 12 is generally smooth.

Hemisphere 14 also has the same raised baseball-like seam 53, but in addition, an insert of felt-like material 40 is provided flush with the surface 54. Thus, the surface contour of hemisphere 14 remains constant or substantially constant throughout (other than where seam 53 is located), with insert 40 providing a portion of contrasting material and/or contrasting surface texture. The felt insert 40 is located within the pear-shaped region of hemisphere 14 between the raised seam 53 and the boundary 16. The remaining portion 54 of the surface of hemisphere 14 is also generally smooth, thereby preserving the feel and appearance of a conventional baseball.

The felt insert 40 combines well with the adjacent raised baseball-like seam 53 in causing significant aerodynamic drag on hemisphere 14. As described, the felt insert 40 need only occupy about one-third of the surface area of hemisphere 14 for optimum performance and appearance, but this may be varied.

The felt inserts 40, being relatively small, fit well to a spherical profile without the need for 'cuts' or 'folds' and may well be sourced using offcuts from other industries, such as the tennis ball manufacturing industry.

Balls already described in the abovementioned patents as having a smooth hemisphere 14, could now also be provided with felt inserts 40 to enhance deviation or curve. No modification would be required to the moulds used to produce such balls.

This invention describes the inclusion of one felt insert on hemisphere 14. However, multiple inserts 40 could be employed for visual effect, and the location of the insert or inserts 40 may be varied to suit particular applications, without detriment to performance. Felt inserts 40 resembling a pattern, logo, letters or numerals could also be used to good effect on hemisphere 14. It is also believed that a small amount of raised or recessed markings could also be located on hemisphere 14. For example, lettering, a logo, a drawing or the like may be included, with or without similar markings on hemisphere 12. It is understood that such a small amount of markings on hemisphere 14 does not affect the performance of the ball, although if the markings are more than a small amount, performance may be affected.

Figure 4:
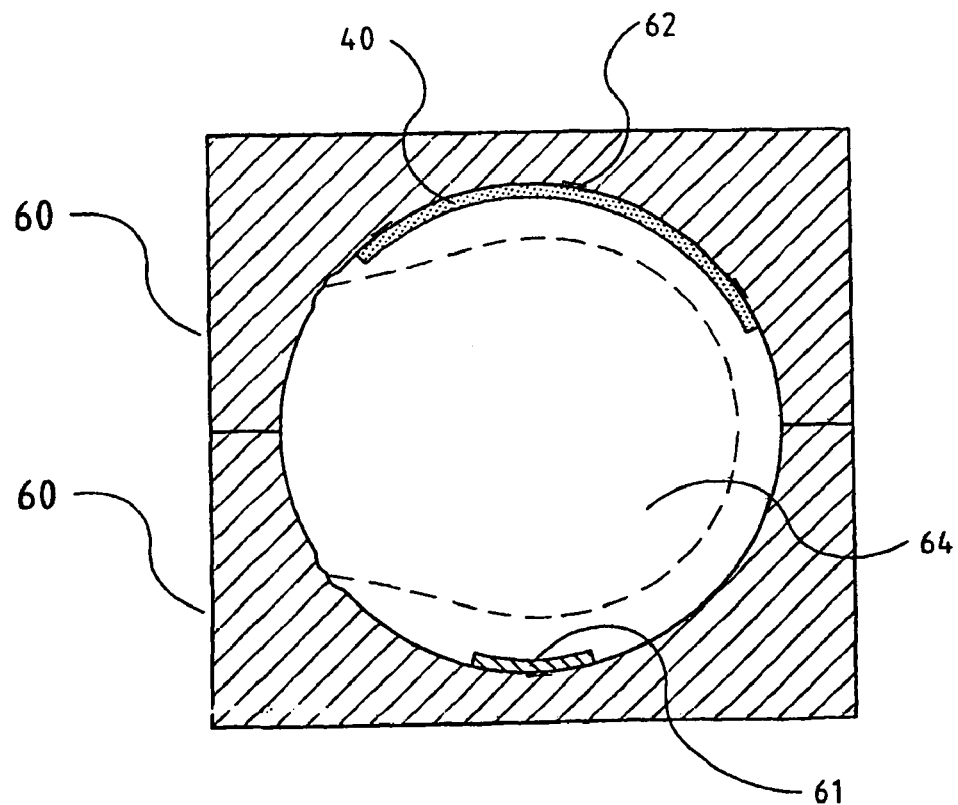
FIG. 4 is a cross-section of a typical mould used to manufacture polyurethane foam play balls.

FIG. 4 is a cross-section of a typical mould 60 used to manufacture polyurethane foam play balls of the type shown in FIGS. 1, 2 and 3. The felt insert 40 is positioned inside the mould using one or more small pieces of Velcro (Registered Trade Mark), adhesive dots 62 or any suitable equivalent material or technique to hold the insert 40 in place in the mould prior to moulding. The manufacturers of Velcro describe their product as a "hook & loop fastener". Such a fastener, or one of the two constituent parts ("hook" and "loop") of such a fastener, is referred to throughout this description and claims as "Velcro-type material". The felt, or a felt-type material, naturally co-operates with Velcro-type material, particularly the "hook" part of such a product.

When the polyurethane foam 64 is injected into the closed mould, the resulting internal pressure buildup forces the felt insert 40 against the inside face of the mould. The end result is a felt patch bonded to, and flush with, the outer face of the foam ball produced by the moulding process, the bond is permanent and water resistant. The flexible polyurethane foam can be formulated such that the viscosity and cream time (curing rate) of the foam allows clean edges to be achieved between the felt insert 40 and the surrounding foam surface of the ball.

The felt inserts 40 blend smoothly with the polyurethane surface and the inserts may be colour-matched with the surface to disguise their presence. Alternatively, contrasting coloured inserts would provide a ball with a somewhat striking appearance. The construction methods described in relation to FIG. 4 mean that existing baseball moulds can be utilised without the need for any modification.

Other types of inserts may be used in place of felt inserts 40. For example, inserts formed of a material such as rubber may be used, with a preferably rough and/or patterned surface. Said rough surface may be achieved using a honeycomb pattern of shallow holes, or a close array of shallow ridges or the like. Other surfaces may include "knobbly" surfaces. However, any type of surface and any suitable type of material may be used.

In another embodiment of this invention, the felt insert or inserts 40 or any alternative inserts, as discussed hereinbefore, could be substituted with inbuilt moulded homogeneous roughness. The need for felt inserts 40 would be avoided, but new moulds would be required. Also, homogeneous roughness (of the general type required) does not mould well in spherical cavities due to air entrapment. Said air entrapment can however be controlled by forming or moulding the flexible inserts as flat pieces and then fitting them inside the moulds. It is also preferred that hemisphere 12 be provided with a 'button' insert 55 (FIGS. 1 and 2), pre-moulded from the same material as the ball, but of contrasting colour.

More preferably, the button insert 55 is located at the crown of hemisphere 12 to provide a visual aid and pointer as to the direction in which the ball curves, thereby clarifying instructions on how to grip and release the ball when throwing.

Even more preferably, said button insert 55 is provided with recessed markings, such as text, a logo or the like.

Furthermore, in relation to hemisphere 12, the present invention also contemplates a means of providing recessed lettering (such as trade marks) or the like without the need to modify existing moulds. To achieve this, a thin engraved badge or stencil (with mirrored image) is bonded to the inside face of the mould. Such a badge or stencils may be removable, and may be interchanged to vary the descriptive information to be moulded into the face of the ball.

Such an approach would facilitate the production of balls with different trade marks, logos or the like, as would be required when supplying such a product to different sporting clubs or organisations, and again, existing moulds could be employed without needing modification.

Figure 5:
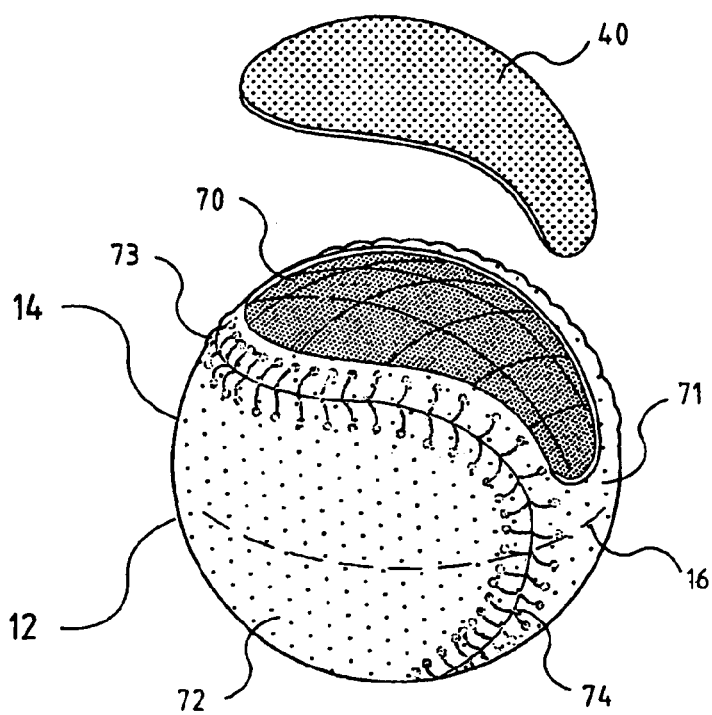
FIG. 5 is a partially-exploded perspective view of a ball in accordance with a second embodiment of the present invention.

One drawback of using urethane material for balls of the type described hereinbefore is that the material is not well suited to being printed, and accordingly it is difficult to present such balls with a desirable attractive appearance. The ball of FIG. 5 is influenced by existing "collector series" practice baseballs marketed by Franklin Sports Inc., which consist of an inner rubber core, with a cover of SYNTEX (Registered Trade Mark) material, which material is printed or otherwise provided with an attractive coloured surface relating to United States major league baseball clubs. It is understood that similar material, in one case referred to as a "synthetic cover", is used in place of the SYNTEX material.

FIG. 5 shows a ball in the form of a baseball, which is preferably a type of practice or leisure baseball which more preferably has a weight somewhat less than that of a regular major league baseball. Reference numerals 12, 14 and 16 have the same meanings as the respective same numerals used in relation to other figures of this application.

The surface of the ball is formed from two "dumbbell" shaped portions, a first portion 71 (FIG. 6) and a second portion 72. Such portions 71, 72 may be secured together about the core (70) of a ball, by stitching or by some other means. The ball of FIG. 5 has actual stitching 73, joining portions 71, 72 about a join 74. Of course, portions 71, 72 may be joined together in any other suitable manner, by being secured to core 70, or may be "virtual" portions which merely define two areas on a single piece of material. The material of one or both of portions 71, 72 may be the aforementioned SYNTEX or equivalent or alternative material, and preferably may be printed with desired patterns, logos, trade marks and the like.

The ball of FIG. 5 has a felt insert 40 which may be described as "pear-shaped". Of course, it may have any other shape. The felt insert effectively replaces part of the material that constitutes portion 71, covers the exposed area of the core 70, and continues the surface profile of portion 71, while providing a contrasting surface roughness. Clearly, it would be possible to secure portions 71, 72 together about core 70, and then remove an area such as shown at 70, replacing it with insert 40. However, it is not considered to be commercially practical to produce an effective ball in that manner.

In addition, for practical reasons, it is preferred that hemisphere 12 of the ball of FIG. 5 is without raised or recessed lettering or markings or the like. The "2 level" surface characteristics required on this hemisphere are provided only by the raised stitched seam 73 which lies predominately within the middle third of the surface area of hemisphere 12.

Figure 6:
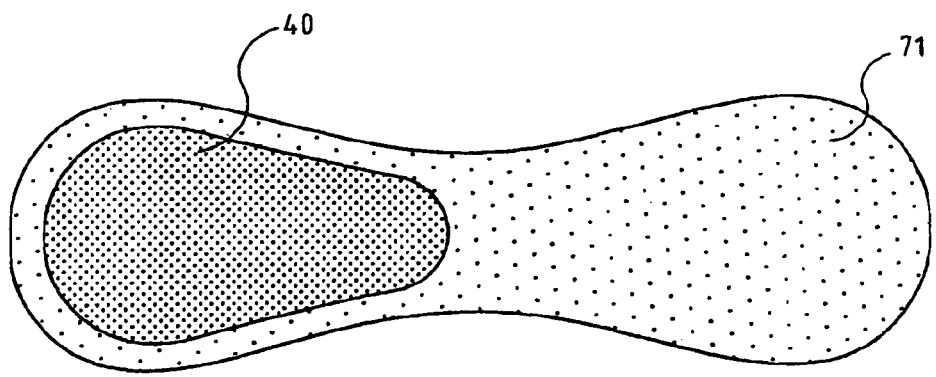
FIG. 6 is a plan view of a first "dumbbell" portion of material for use in the production of the ball of FIG. 5.
Figure 7:
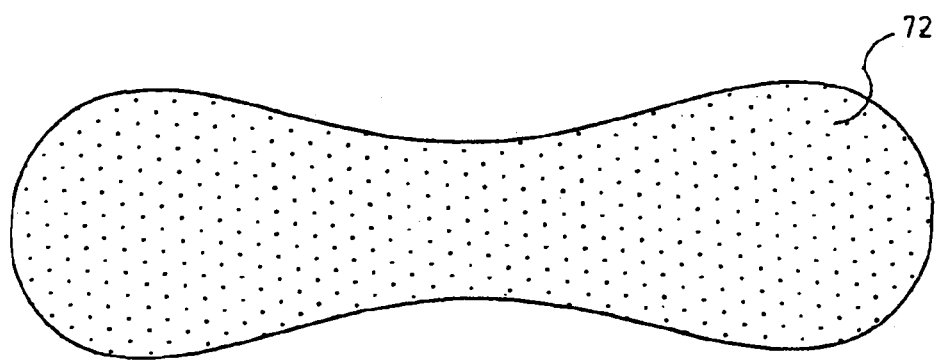
FIG. 7 is a plan view of a second "dumbbell" portion of material for use in the production of the ball of FIG. 5

By way of preference, it is desirable to locate insert 40 in portion 71 before portion 71 is joined to portion 72 about core 70. Such an arrangement is shown in FIG. 6. The insert 40, which could be of any suitable material, and have any suitable outer (in use) surface, may be secured to the material of portion 71 by securing the edges of the aperture therein to the edges of the insert 40. However, it is envisaged that a thin but suitably strong backing strip (not shown) would be located on the rear surface of portion 71. Insert 40 may be secured or adhered to the backing strip and (if desired) also to the edges of the aperture in portion 71.

In the ball of FIG. 5, the (imaginary) circumferential seam 16 is shown in the "equatorial" position. It can be seen that insert 40 is located wholly within the "northern" hemisphere of the ball of FIG. 5, and that when the ball is projected with the fingers along that seam 16, the ball will behave as described earlier in this specification.

Of course, in relation to the ball of FIG. 5, it is desired to have those balls of sufficient weight to approach the feel of a real baseball, but not having so much weight that it overrides the effect of inserts 40.

Figure 8:
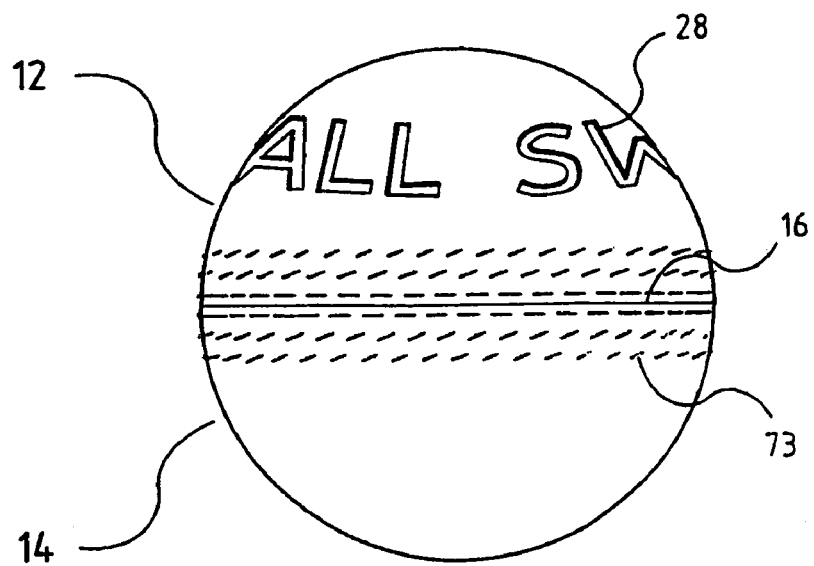
FIG. 8 is an elevation of a ball in accordance with Australian Patent No. 588223, and equivalent U.S. Pat. No. 4,874,169.

FIG. 8 shows a ball in accordance with FIG. 3 of Australian Patent No. 588223 and equivalent U.S. Pat. No. 4,874,169, both in the name of Peter Graham Litchfield.

Hemisphere 12, hemisphere 14, line 16 and recessed letters 28 have the same general meaning as for the ball of FIG. 3 in the abovementioned patents. A simulated cricket ball stitched seam 73 has been included. Said seam 73 constitutes a series of small protrusions or depressions to mimic the stitching lines of a traditional cricket ball seam. The addition of the seam has no advantageous or detrimental effect on the ability of a ball of this general type to swing. This is because the seam coincides with line 16 as stated in the above mentioned patents. Balls of this type have been manufactured, and in test have been found to swing well.

Figure 9:
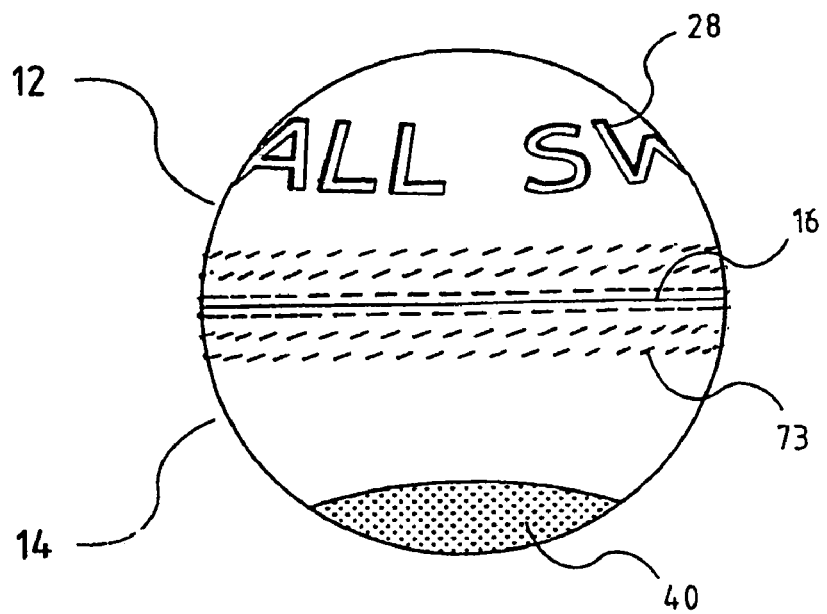
FIG. 9 is an elevation of an improved version of the ball of FIG. 8, which constitutes a third embodiment of the present invention.

FIG. 9 shows a ball which is an improved version of the ball of FIG. 8. The improvement is constituted by a felt insert 40 being added to the crown of smooth hemisphere 14 in the manner previously described. Said insert 40 is circular and occupies approximately one quarter of the surface area of hemisphere 14. The inclusion of insert 40 enhances the amount of swing achievable, and gives the ball a novel appearance and feel similar to the baseball versions previously described.

A further embodiment of the present invention may be seen as an adaption of existing simulated cricket balls. One form of such a ball is a Gray-Nicolls (Registered Trade Mark) "Wonder Ball", which is the size of a conventional cricket ball, weighs about 110 g, and which features a PVC cover approximately 2 mm thick, over a foam core of a substance such as polyurethane. The ball has a seam with actual stitching—described on packaging as having "traditional six-stitch construction"—on either side of the join line between hemispheres. Another very similar ball—although it is slightly lighter—is the "Kanga King", marketed under the aegis of the Australian Cricket Board.

Both of the abovementioned balls have a good weight, and with the stitching would, it is felt, be attractive to potential users such as adolescents and adults. As marketed, the two hemispheres of each ball do not have any feature which would make them swing in the manner previously described, but one hemisphere could be designated 12 (as discussed earlier in this specification) and one could be designated 14 (also as discussed earlier in this specification).

Hemisphere 12 may be treated in accordance with disclosures of Australian patent No. 588223, with a two-level effect being created by being moulded into or onto the PVC cover. Hemisphere 14 may be provided with one or more inserts, preferably of felt, as described earlier in this specification in relation to other embodiments, more preferably located flush with the surface of the PVC cover. Even more preferably, one or more such inserts is located on or near the crown or "polar" region of hemisphere 14.

A prototype adaption of a ball such as the "Wonder Ball" has been produced.

Hemisphere 12 was provided with the treatment outlined in Australian patent no. 588223, and hemisphere 14 was provided with a circular (more accurately a frusto-spherical) felt portion located on the crown or polar region of the hemisphere. It was found that such a prototype ball swung markedly.

By way of an alternative, hemisphere 14 may have a portion or portions of its area provided with roughness, either moulded into the PVC covering or inserted flush with the outer surface of the PVC covering. The means of attachment to hemisphere 14 could, for example, include moulding a felt insert partly into/onto the foam core and fitting a PVC cover with a matching opening, and thereafter sealing the assembly.

It would also be possible, for the balls of any of the embodiments described in this specification, to locate one insert within another insert. For example, a smaller felt insert could be located in a larger urethane insert, or an area of roughness, thereby achieving a similar result to having a (larger) felt-only insert. Of course, material(s) other than felt, or a felt-like material, may be used.

It can be seen that the present invention provides improved simulated baseballs and cricket balls that can be bowled or thrown in a manner causing them to swing or curve in flight. It can also be seen that they can be manufactured by a simple, cost-effective process, in which existing moulds can be used with little or no modification being required. Furthermore, softballs, (the 'larger cousin' of baseballs) have the same meaning as baseballs in this specification, since the same aerodynamic principles apply. Balls in accordance with the present invention perform as well as, or better than, balls of the previously-mentioned patents, as illustrated by the performance diagrams appearing in the specifications of those patents.

The entire contents of the specification and drawings of each of Australian provisional patent applications nos. PR4746, filed on 3 May 2001, PR4970, filed on 14 May 2001, and PR5799, filed on 19 Jun. 2001, are hereby incorporated into the disclosure of this specification.

The claims form part of the disclosure of this specification.

What is claimed is:

1. A ball adapted to be projected to deviate from an expected trajectory, said ball having a spherical shape and comprising a first hemisphere and a second hemisphere, said second hemisphere having a hemispherical surface, wherein a first portion of said hemispherical surface has a generally smooth texture, and a second portion of said hemispherical surface has a generally rough texture, and wherein said ball is a simulated baseball, the surface of which is constituted by a first dumbbell shaped surface area and a second matching dumbbell shaped surface area, with a raised simulated seam connecting said surface areas, wherein said second portion is located within a bulbous end of one of said first or second dumbbell shaped surface areas and is one insert located symmetrically within said bulbous end.

2. The ball according to claim 1, wherein said second portion has the surface texture of felt.

3. The ball according to claim 1, wherein said second portion constitutes about one-third of said hemispherical surface.

4. The ball according to claim 1, wherein said first hemisphere is provided with raised or recessed markings.

5. The ball according to claim 1, wherein a surface of said first hemisphere has a substantially smooth texture.

6. The ball according to claim 1, wherein said one insert is pear-shaped.

7. The ball according to claim 1, wherein said insert is flush with the hemispherical surface.

8. A ball adapted to be projected to deviate from an expected trajectory, said ball having a spherical shape and comprising a first hemisphere and a second hemisphere, said second hemisphere having a hemispherical surface, wherein a first portion of said hemispherical surface has a generally smooth texture, and a second portion of said hemispherical surface has a generally rough texture and wherein said second portion is in the form of an insert flush with the hemispherical surface.

9. The ball according to claim 8, wherein said second portion is constituted by a plurality of surface elements.

10. The ball according to claim 8, wherein said second portion has the surface texture of felt.

11. The ball according to claim 8, wherein said second portion constitutes about one-third of said hemispherical surface.

12. The ball according to claim 8, wherein said first hemisphere is provided with raised or recessed markings.

13. The ball according to claim 8, wherein a surface of said first hemisphere has a substantially smooth texture.

14. The ball according to any one of claims 8–13, wherein said ball is a simulated baseball, the surface of which is constituted by a first dumbbell shaped surface area and a second matching dumbbell shaped surface area, with a raised simulated seam connecting said surface areas, and wherein said second portion is located within one of said first or second dumbbell shaped surface areas.

15. The ball according to claim 8, wherein said ball is a simulated baseball, the surface of which is constituted by a first dumbbell shaped surface area and a second matching dumbbell shaped surface area, with a raised simulated seam connecting said surface areas, and wherein said second portion is located within a bulbous end of one of said first or second dumbbell shaped surface areas.

16. The ball according to claim 15, wherein said second portion is one insert located symmetrically within said bulbous end and is pear-shaped.

17. The ball according to claim 8, wherein an indication is provided at a crown of said first hemisphere, to show the direction in which the ball will curve when projected.

* * * * *